US006928072B1

(12) United States Patent
Sawada

(10) Patent No.: US 6,928,072 B1
(45) Date of Patent: Aug. 9, 2005

(54) COMMUNICATION DEVICE FOR PROVIDING INFORMATION UTILIZING SUBSCRIBER LINE

(75) Inventor: Akemi Sawada, Chiba-ken (JP)

(73) Assignee: Yugen Kaisha LS Net, Chiba-ken (JP)

(*) Notice: Subject to any disclaimer, the term of this patent is extended or adjusted under 35 U.S.C. 154(b) by 0 days.

(21) Appl. No.: 09/308,114

(22) PCT Filed: Sep. 18, 1998

(86) PCT No.: PCT/JP98/04199

§ 371 (c)(1),
(2), (4) Date: May 13, 1999

(87) PCT Pub. No.: WO99/16212

PCT Pub. Date: Apr. 1, 1999

(30) Foreign Application Priority Data

Sep. 24, 1997 (JP) ................................ 9/258839

(51) Int. Cl.[7] .......................................... H04L 12/66
(52) U.S. Cl. ................... 370/354; 370/360; 370/400; 370/467; 379/220.1
(58) Field of Search ................. 370/351–352, 370/353–357, 360, 254, 408, 389, 400–405, 370/409, 410, 466, 467; 379/114.05, 114.29, 379/93.09, 93.14, 93.01, 219, 220, 220.1; 345/733

(56) References Cited

U.S. PATENT DOCUMENTS

| | | | |
|---|---|---|---|
| 5,796,393 A | * | 8/1998 | MacNaughton et al. .... 345/733 |
| 5,956,391 A | * | 9/1999 | Melen et al. ............... 379/114 |
| 6,021,120 A | * | 2/2000 | Beyda et al. ............... 370/282 |
| 6,157,648 A | * | 12/2000 | Voit et al. .................. 370/354 |
| 6,233,234 B1 | * | 5/2001 | Curry et al. ............... 370/356 |
| 6,349,096 B1 | * | 2/2002 | Liu et al. ................... 370/352 |
| 6,721,306 B1 | * | 4/2004 | Farris et al. ............... 370/352 |

FOREIGN PATENT DOCUMENTS

| | | |
|---|---|---|
| JP | 05-303532 | 11/1993 |
| JP | 08-340583 | 12/1996 |

OTHER PUBLICATIONS

Schoen, U. et al., "Convergence between public switching and the Internet" ISS '97 World Telecom. Congress, Totonto, Canada, Sep. 21-26, 1997.
Orlamuender, H. et al., "Handling Internet Traffic in Telecommunications Networks", ISS '97 World Telecom. Congress, Toronto, Canada, Sep. 21-26, 1997.
Carbone, P., "Internet Thruway: A Profitable New Route for Data Traffic", TELESIS, Bell-Northern Research Ltd., Ottawa, Canada No. 102, Dec. 1, 1996, pp. 6-15.

* cited by examiner

Primary Examiner—Inder P Mehra
(74) Attorney, Agent, or Firm—Notaro&Michalos PC

(57) ABSTRACT

A communications device (11) is connected with a subscriber switching station (13) through a subscriber line (12). The subscriber switching station (13) has a subscriber switching system (14), a switch (15), and an LAN (16). The subscriber line (12) is selectively connected with the subscriber switching station (14) and the LAN (16) through the corresponding switch (15). A conventional dial operation is performed for conventional communications. On the other hand, "0AB0" is dialed to participate communications over the LAN (16) when accessing a resource for example the WWW server (17) on the LAN (16). Then, a transfer request is sent to the WWW server (17) using a conventional procedure, and the device receives a required HTML document and the associated files.

12 Claims, 2 Drawing Sheets

COMMUNICATION DEVICE FOR PROVIDING INFORMATION UTILIZING SUBSCRIBER LINE

TECHNICAL FIELD

This invention relates to a communications technique suitable for providing information relevant to a community or a local society.

BACKGROUND ART

A variety of servers are connected with wide area networks and local area networks to compose the Internet. Nodes on the Internet are uniquely assigned with IP addresses, and worldwide communications among nodes can be performed by specifying corresponding IP addresses. For instance, people access a WWW server storing a target HTML document to browse the document.

By the way, a user would rather not want to collect information all over the world in many cases but information relevant to the community. For instance, a user wants to get information as to services provided by the local government, local shops, local volunteer activities, etc. Moreover, a user often wants to do opinion exchange and enjoy bulletin board services within the local area.

For those purposes, a user of the Internet finds out an appropriate server by means of one or more retrieval services provided through the Internet, and brows contents on the server. Moreover, if it is necessary, the user registers the server in the user's book mark, etc. However, the retrieval services and the book mark registration only provide a possible access route to information as to the community. The user still sees a vast uncultivated field of the Internet connected with nodes spread in the world. A bird's-eye view of information relevant to the community could not be provided.

The present invention accordingly aims at providing a communications technique suitable for providing information relevant to a community.

DISCLOSURE OF THE INVENTION

According to the present invention, in order to attain the above mentioned object, a communications system comprising: branching means connected with a communications line; switching system means connected with one terminal of the branching means; and, information providing server, provided as associated with the switching system means, and connected with another terminal of the branching means, for providing a subscriber device with service in response to a request through the communications line.

The above mentioned communications line can be a subscriber line connected with a subscriber device or a relay line connecting a switching station with a higher order switching station. The communication line can be cable or wireless.

In this configuration, the branching means enables not only a conventional telephone call but also access to a server. The access to the server is basically limited to the territory of the corresponding switching station, because the access is performed through the branch point in front of the subscriber switching station or the relay switching station. The service provided by the server can be limited to what is associated with that territory. Therefore, a user can obtain information mainly relevant to the community.

Further, the information stored on the server can be accessed without using the facilities implemented at the back side from the branch point in the switching system (circuit switching or store-and-forward switching system), and therefore, the service cost can be suppressed to extremely low.

The server can be an information providing server such as a WWW server, or a mail server, and in other words, it can be what provides a client with a any type of service. Further, the branching means and the server can be placed in the corresponding switching station. Of course, those facilities can be placed out of the switching station.

BEST MODE FOR CARRYING OUT THE INVENTION

Figure 1:
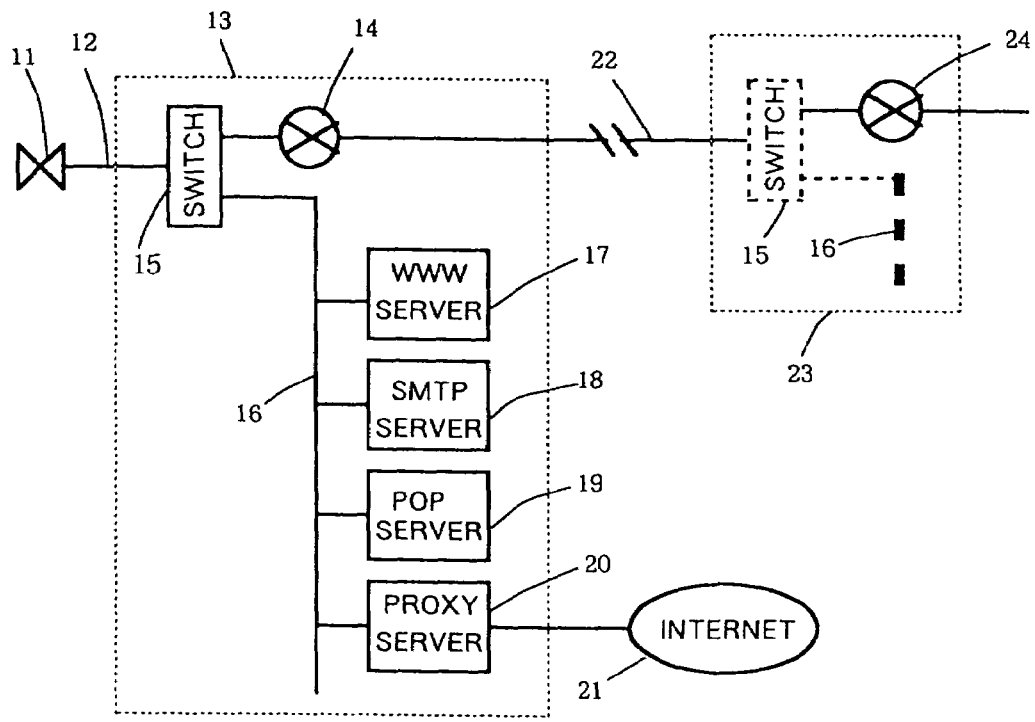
FIG. 1 is a block diagram depicting the overall configuration of the first embodiment of the present invention.

Embodiments of the present invention will be described below. FIG. 1 shows an overview of the first embodiment of the present invention, and in this figure, a communications terminal (for example, a personal computer having a modem, a personal digital assistant, an intelligent telephone set) 11 is connected with a subscriber switching station 13 through a subscriber line 12. The communications terminal 11 has client functions to enjoy the services provided by servers 17 to 20 described in detail later. Moreover, the communications terminal 11 can have a telephone call function. The subscriber switching station 13 has a subscriber switching system 14, a switch 15, and an LAN (Local Area Network) 16. The subscriber line 12 is selectively connected with the subscriber switching system 14 and the LAN 16 through the corresponding switch 15. A pair of a subscriber switching system 14 and a LAN 16 are basically provided for each subscriber switching station 13. Accommodated subscriber lines 12 at each switching station may be divided into two or more classes, and a switching system 14 and a LAN 16 may be installed for each class. The LAN 16 contains a WWW server 17 and an SMTP (Simple Mail Transfer Protocol) server 18 and a POP (Post Office Protocol) server 19 and a proxy server 20, etc. The WWW server 17 supplies an HTML document and associated files to the communications terminal 11 based on the HTTP protocol through the subscriber line 12 and the switch 15. The SMTP server 18 forwards an e-mail based on the SMTP protocol. The POP server 19 receives an e-mail forwarded by the SMTP protocol. The proxy server 20 enables the connection with internet 21.

Moreover, the subscriber switching station 13 is connected with a relay switching station 23 through a trunk or relay line 22. That relay switching station 23 can be connected with a higher order switching station (not shown). That relay switching station 23 has a relay switching system 24. Moreover, a switch 15 and an LAN 16 can be installed in the relay switching station 23 as shown with broken lines.

Figure 2:
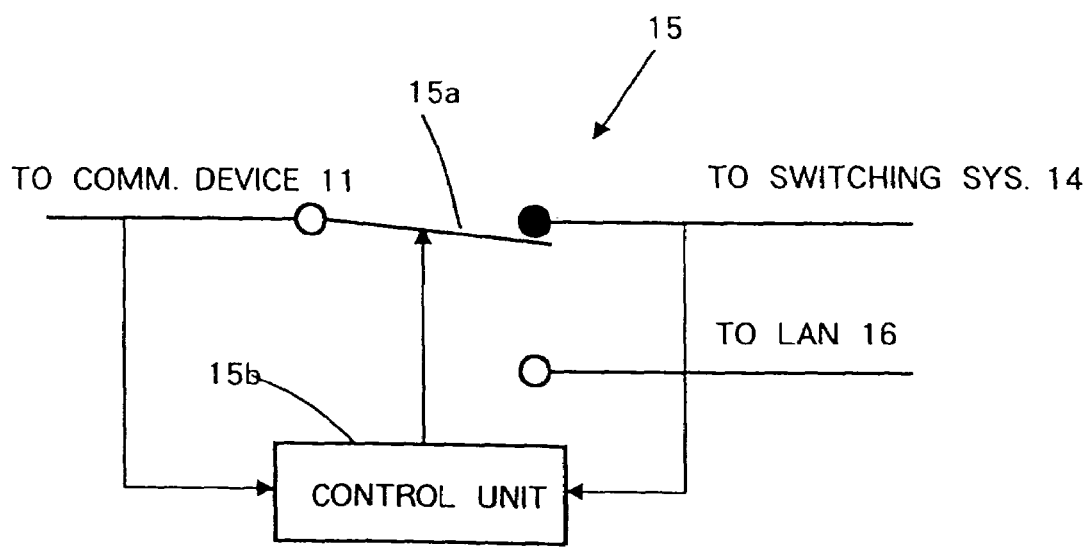
FIG. 2 illustrates a switch 15 shown in FIG. 1.

FIG. 2 illustrates the configuration of the switch 15, and in this figure, the switch 15 has a switch function unit 15*a* and a control unit 15*b*. In this embodiment, for conventional communications (a telephone call) using switched connection over the switching system 14, a conventional subscriber number is dialed as it is. On the other hand, a service identification number, for instance, "0AB0" (A and B are for instance "5") is dialed, when accessing a resource over the LAN 16. The control unit 15b of the switch 15 detects the service identification number, and then switches the switch function unit 15a from the switching system 14 to the LAN 16. The switch can be returned to the original state by a possible method. One method is to dial another service identification number "0AB0" (a, b are for example "3").

Between the switch 15 and the LAN 16, an access server or another like device, not shown, is placed for interface between signals on the subscriber line 12 and on the LAN 16.

Moreover, the control unit 15b performs certain processing when the communications terminal 11 receives a call-out signal. For instance, upon receipt of a call-out signal, the switch function unit 15a is connected with the switching system 14 side for conventional communications (a telephone call). Alternatively, an HTML document indicating of receipt of the call-out signal (the telephone number, etc. of the calling party) is sent to the communications terminal 11, and then the user can control the switch. The data of received calls can be recorded with a recording function, and a server such as the POP server 19 can be used for confirmation or replay of the recorded calls.

In this embodiment, a destination number is dialed in a conventional way for conventional communications. On the other hand, "0AB0" is dialed to participate communications over the LAN 16, when accessing a resource on the LAN 16 for example a web page of the WWW server 17. Then, a transfer request is sent to the WWW server 17 using a convention procedure (CSMA/CD), and the communication terminal receives the requested HTML document and associated files.

As such, a resource on the LAN 16 can be accessed by for example a personal computer, and for example a web page is browsed. The resources on the LAN 16 can be controlled or administrated within the LAN, and therefore be regulated suitable for the concerned community. The system provides one of the best means to publicize, for instance, details of services provided by the local government, information as to the local schools, details of public facilities, etc. Moreover, it provides local commercial entities with one of the best advertisement method. Moreover, it is suitable also for purchase orders. For that purpose, data can be accepted by using CGI (Common Gateway Interface), etc. at the WWW server 17. Moreover, mails among local users can be exchanged.

When the territory of the switching station 13 is smaller than the range in which common information is to be shared (for example an administrative unit), a plurality of switching stations 13 belonging to the range can share at least a portion of the information and store the same copies respectively. Oppositely, when the territory of the switching station 13 is bigger than the range in which common information is to be shared, the information can be divided into sub-sets to be provided (for corresponding smaller areas). Moreover, the switching station 13 can have a plurality of LAN 16 (with servers). The communications terminal 11 can be connected with a required LAN using a corresponding additional service identification number assigned for the corresponding area. For instance, a LAN 16 can be provided for each district section within Tokyo, such as, Chiyoda-ku, Chuo-ku. Moreover, two or more hosts can be installed in a single LAN 16 and a set of servers can be assigned to each small area. For instance, a WWW server 17 and an SMTP server 18 and a POP server 19 are provided for each small area. In this case, a user can get information relevant to the corresponding community by specifying the hostname.

While, in this embodiment, the LAN 16 is provided to enable access to a variety of servers such as the WWW server 17, the terminal can be connected with the server 17, etc. directly through the switch 15.

Moreover, it is possible to access a resource on the Internet 21 through the proxy server 20.

Moreover, a frequency division technique can be used for separation between conventional communications and other communications related to resources on the LAN 16. In that implementation, a splitter can be used in place of the switch 15. For instance, it is possible to do communications related to the LAN using a digital subscriber line method (ADSL, etc.).

Moreover, in a non-activated state, the communications terminal 11 is switched to the LAN 16, and upon receipt of a control signal of call-out, the switch function unit 15a is controlled to switch to the switching system 14. Because the access to the LAN 16 does not apply the load to the switching system 15, the service cost of such an implementation is considered as inexpensive.

Figure 3:
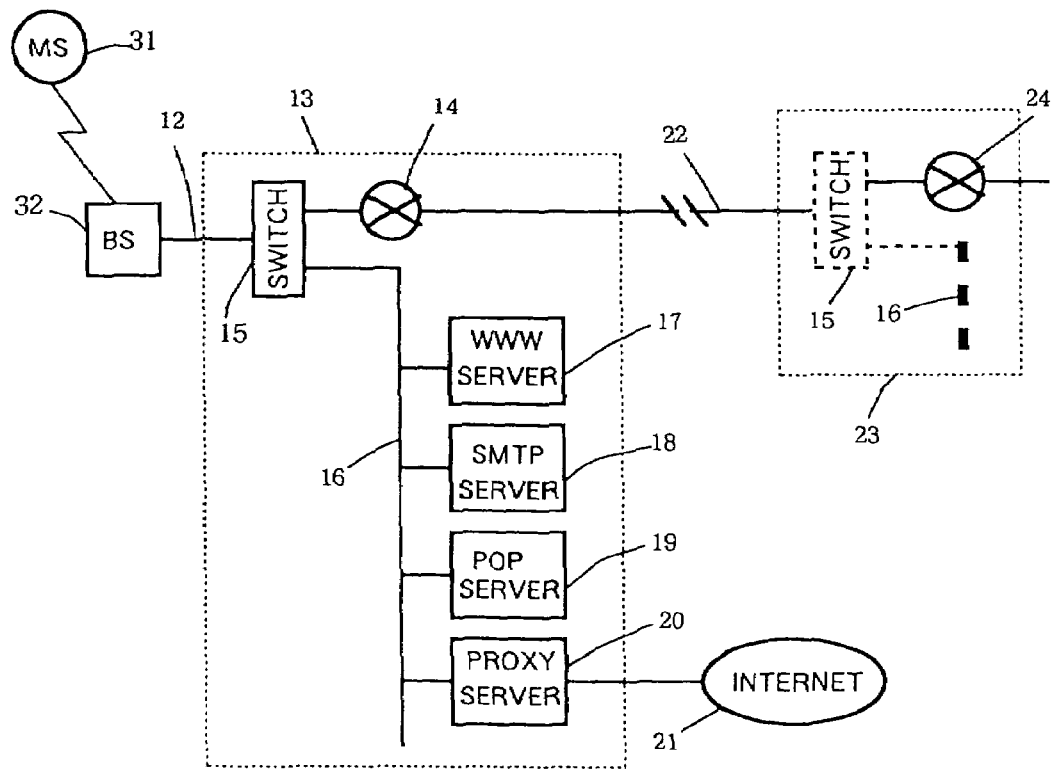
FIG. 3 is a block diagram depicting the overall configuration of the second embodiment of the present invention.

FIG. 3 illustrates the second embodiment of the present invention. In this embodiment, the invention is applied to a radio communications system. While a mobile communications system is exemplified here, one or more mobile stations can be replaced by fixed radio communications devices. In FIG. 3, the corresponding parts to those in FIG. 1 are indicated with the corresponding referential symbols.

In FIG. 3, a mobile station 31 and a base station 32 are connected through a wireless channel. The base station 32 is connected with a switching station (mobile switching station) 13.

Also according to this embodiment, the resources on the LAN 16 can be accessed by dialing the predetermined service identification number. Remarkably, it is predicted that each resource on the LAN 16, which is accessed by the mobile station 31 such as a mobile personal computer, or a personal digital assist, stores the information relevant to the area where the mobile station 31 stays, because the LAN 16 is provided for the switching station 13 covering the area. Therefore, the system is suitable for providing people on travel or transit with the information relevant to the local area, for instance, traffic information, weather information, shopping information.

As described above, according to the embodiments of the present invention, it is possible to access to an information providing LAN directly through a cable or wireless subscriber line, and obtain information relevant to a community. In this configuration, information services can be provided with more inexpensive cost, because what is mainly used is only subscriber lines. Moreover, it is possible to connect also with the Internet, and an appropriate charge can be added in this case.

Subscriber lines can be conventional telephone lines or ISDN lines.

INDUSTRIAL APPLICABILITY OF THE INVENTION

As described above, according to the present invention, one or more servers are provided as associated with a switching station, so as to provide mainly information relevant to a community.

What is claimed is:
1. A communications system comprising:
   a subscriber switching system provided at a subscriber switching station for exchanging telephone calls;
   a LAN associated with the subscriber switching system, the LAN not being directly connected to an Internet;

branching means provided at the subscriber switching station, the branching means having a common terminal point, a first branching terminal point and a second branching terminal point, the common terminal point being connected with a subscriber line at a side of the subscriber switching system, the first branching terminal point being connected with the subscriber switching system, and the second branching terminal point being connected with the LAN, the common terminal point and the first branching terminal point being used in combination for establishing a first path for conventional telephone communications using the subscriber switching system, and the common terminal point and the second branching terminal point being used in combination for establishing a second path for data communications transferred over the LAN; and, at least one information providing server connected to and associated with the LAN, for providing a communication terminal with information through the LAN and the subscriber line.

2. The communications system of claim 1, wherein the LAN connected with the at least one information providing server is placed together with the subscriber switching system in a corresponding switching station.

3. The communications system of claim 1, wherein the at least one information providing server comprises a document browsing server.

4. The communications system of claim 1, wherein the at least one information providing server comprises a mail server.

5. The communication system of claim 1, wherein call-out information is generated in response to a call-out signal from the subscriber switching system to the subscriber line, and the call-out information is supplied on the subscriber line.

6. The communications system of claim 1, wherein the branching means connects the subscriber line with the subscriber switching system in response to a call-out signal sent from the switching system to the subscriber line.

7. The communications system of claim 1, wherein the subscriber line is connected with the at least one information providing server based on a service identification number.

8. The communications system of claim 7, wherein the at least one information providing server, one information providing server being provided for each of at least one community, is accessed by inputting the service identification number followed by a corresponding identification code for one of the at least one community.

9. The communications device of claim 1, wherein an access point to the Internet is connected with the LAN.

10. The communications system of claim 1, wherein the branching means separates signals based on frequency bands.

11. A communications system comprising:

a mobile switching system provided at a mobile switching station for exchanging mobile telephone calls;

a LAN associated with the mobile switching system, the LAN not being directly connected to an Internet;

branching means provided at the mobile switching station, the branching means having a common terminal point, a first branching terminal point and a second branching terminal point, the common terminal point being connected with a subscriber line from a base station at a side of the mobile switching system, the first branching terminal point being connected with the mobile switching system, and the second branching terminal point being connected with the LAN, the common terminal point and the first branching terminal point being used in combination for establishing a first path for mobile telephone communications using the mobile switching system, and the common terminal point and the second terminal branching terminal point being used in combination for establishing a second path for data communications transferred over the LAN; and, at least one information providing server connected to and associated with the LAN, for providing a mobile station with information through the LAN, the susbcriber line, and the base station.

12. A communications system comprising:

a subscriber switching system provided at a subscriber switching station for exchanging telephone calls;

at least one communication terminal separate from and connected to the subscriber switching station;

a LAN associated with the subscriber switching system, the LAN not being directly connected to an Internet;

branching means provided at the subscriber switching station, the branching means having a common terminal point, a first branching terminal point and a second branching terminal point, the common terminal point being connected with a subscriber line at a side of the subscriber switching system, the first branching terminal point being connected with the subscriber switching system, and the second branching terminal point being connected with the LAN, the common terminal point and the first branching terminal point being used in combination for establishing a first path for conventional telephone communications using the subscriber switching system, and the common terminal point and the second branching terminal point being used in combination for establishing a second path for data communications transferred over the LAN; and, at least one information providing server connected to and associated with the LAN, for providing the at least one communication terminal with information through the LAN and the subscriber line.

\* \* \* \* \*